United States Patent [19]

Thomas

[11] 4,111,061

[45] Sep. 5, 1978

[54] VARIABLE ECCENTRIC VIBRATION GENERATING MECHANISM

[76] Inventor: Hubert E. Thomas, 838 W. Mitchell Apt. 469, Arlington, Tex. 76013

[21] Appl. No.: 815,935

[22] Filed: Jul. 15, 1977

Related U.S. Application Data

[63] Continuation-in-part of Ser. No. 764,721, Feb. 2, 1977, abandoned.

[51] Int. Cl.[2] .......... F16H 33/00

[52] U.S. Cl. .......... 74/61

[58] Field of Search .......... 74/61

[56] References Cited

U.S. PATENT DOCUMENTS

| | | | |
|---|---|---|---|
| 3,813,950 | 6/1974 | Ebersole | 74/61 |
| 3,814,532 | 6/1974 | Barrett et al. | 74/61 |
| 3,896,677 | 7/1975 | Larson | 74/61 |

*Primary Examiner*—Benjamin W. Wyche
*Assistant Examiner*—Wesley S. Ratliff, Jr.

[57] ABSTRACT

A rotatable vibration generating mechanism includes a movable eccentric weight. Said weight is variably positioned to change the eccentricity of the mechanism by the controlled flow of fluid (liquid or air) when the mechanism is stationary or rotating. More than one weight may be used and a combination of movable parts may be used as a compound movable weight. The fluid pressure resisting the movement of the weight is recorded and thus the centrifugal force generated is known through calculation, since the weight, shape, geometric configuration, and positioning of the eccentric weight is known. The centrifugal force can be changed without changing the rotating speed through the use of valve means regulating fluid flow to change the position of the eccentric weight. Pressure sensitive controls may be adapted to the valve means to make the flow control automatic so that the centrifugal force can be held constant or limited through a specified vibrational speed range. A choice of a variety of fluid pressure source means may be used to force the movement of the weight.

17 Claims, 16 Drawing Figures

VARIABLE ECCENTRIC VIBRATION GENERATING MECHANISM

CROSS REFERENCE TO RELATED APPLICATION

This application is a continuation-in-part of co-pending application Ser. No. 764,721 filed Feb. 2, 1977, now abandoned.

BACKGROUND AND SUMMARY OF THE INVENTION

This invention relates to a new vibration generating mechanism. It will find usage in nearly all equipment where vibration or centrifugal force is used to perform work. This mechanism can be adapted to equipment such as vibratory conveyors, vibratory screens, vibratory feeders, vibratory screeds, vibratory rollers/ compactors, separators, vibratory metal finishing, grain crushers, tamping plates, pile drivers, and pavement breakers. The variable eccentricity, force and amplitude values that are made available by this invention, for every vibrational speed, will be found to increase the versatility of all the equipment listed. In all of these applications it is desirable at times under varying loads and when working with a variety of material to keep the same vibrational frequency and change the amount of generated centrifugal force and vibrational amplitude. On the other hand it is desirable at times to change the freqency without changing the force. Another option with this device is to increase the frequency and decrease the force starting from a given value of frequency and force. Controls can be adapted to use the mechanism as a constant force/variable frequency device that is desirable on certain applications.

This invention relates specifically to a vibration generating mechanism that has a movable weight(s) that is (are) positioned selectively to change the eccentricity of the mechanism. The changes in eccentricity are made by controlling the flow of fluid (liquid or air) to the mechanism. The changes can be made while the mechanism is stationary or rotating. The eccentricity can vary from nearly zero to any reasonable value determined by the designer. The mechanism provides a range of eccentricity values for any speed value. The invention includes a pressure gauge(s) which records the pressure caused by the tendency of the movable weight(s) to move outwardly as the mechanism rotates. This pressure reading can be directly converted to the value of centrifugal force being generated when the dimensions of the weight are known. The eccentricity is determined when the centrifugal force and rotational speed are known. The theoretical amplitude desired is generally used as a given value and a starting point in determining the eccentricity needed in a vibration generating mechanism.

The invention includes a source of fluid (liquid or air) pressure. The pressure source used will depend on the application, material availability and the designer's choice. An air compressor with common components and valving is one choice. A hydraulic pump with proper circuitry is another choice. A fluid cylinder with proper circuitry and actuating means can be used. A grease gun can also be used to position the weight(s). A cylinder with proper circuitry common in the art and actuating means would be a preferred embodiment for many applications because it could be used as valve means and a pressure source.

Various embodiments of the invention are disclosed. The movable weights are different in character and arrangement and are pictorially described in the drawings. All of the weights are positioned and held in position by fluid in the various cylinder means. Pressurized fluid is channeled to and from a cylinder through various common means from a bearing journal passage connected with a rotary coupling connected with a supply line that is connected to valve means and one of the variety of pressure sources listed previously. A pressure gauge is connected to the supply line recording pressure relating directly to the centrifugal force being generated as the mechanism is rotated.

Knowledge of the generated centrifugal force and the amplitude along with the capability of adjusting them without changing the vibrating speed will make the work in many vibrating applications more efficient. The inventor knows of no other vibration generating mechanism that provides this information directly and continuously. Heretofore with most vibratory generating mechanism except as noted herein the only way to adjust the force was to change the vibrating speed. With this invention the force and amplitude can be adjusted between zero and some predetermined maximum rated value fo each effective infinitely variable vibrating speeds. The controls referred to previously in respect to constant force/ variable frequency are an optional feature that will be economically feasible for some applications where constant force is a prime requisite or where limiting the value of centrifugal force is mandatory. These pressure sensitive controls common to the art can be built into or adapted to the valve means and incorporated in all the embodiments. As an option these controls are shown in dashed lines attached to the valve means in the drawings.

The first embodiment includes a rotatable mechanism with a piston like movable weight enclosed in a cylinder. The weight is offset and thus has a tendency to move away from the axis of rotation when the mechanism is rotated. This movement is resisted and restricted by fluid in the cylinder. The positioning of the weight and the amount of force generated for any of the infinitely variable speeds is controlled by forcing fluid into the cylinder decreasing the eccentricity or by allowing fluid to leave the cylinder which increases the eccentricity. The control of this flow is accomplished through valve means and a pressurized fluid source. The valve means with pressure sensitive controls may be used as an option. The mechanism includes a rotary fluid coupling so that the transfer of fluid can be made whether or not the mechanism is rotating. The fluid supply line to the rotary coupling does not rotate. It is connected to valve means and fluid pressure source that are located on a non-vibrated part or on a part from which vibration has been effectively dampened. A significant part of this invention is the pressure gauge connected with the supply line that records the fluid pressure in the cylinder. This value can be converted to generated centrifugal force when the weight and size of the movable weight is known.

A second embodiment incorporates cylinder means with enclosed movable weights as described above. In addition it incorporates a duplex rotary fluid coupling which allows for two separate fluid circuits to pass through the bearing journal nearest to the rotary coupling. One of these circuits controls the weight as in the first embodiment. The other circuit passes through the passage in the opposing bearing journal and the flow therein controls the position of the movable weight in a second similar mechanism that is rotated synchronously with the mechanism that is shown.

A third embodiment incorporates two cylinders with enclosed piston like weights. The movement of the offset weights is resisted and restricted by fluid in the cylinders. The fluid is supplied through a duplex rotary fluid coupling mounted on the end of the mechanism. The duplex rotary fluid coupling has two separate passages and separate supply lines so that the position of the weights inside the cylinders are controlled individually as desired.

A fourth embodiment incorporates a cylinder with an included piston and piston rod. The piston rod extends through one end of the cylinder in a normal manner and is fastened to a weight outside the cylinder. The piston, seals, piston rod and exterior weight combine to make a compound movable eccentric weight. The eccentricity of the center of gravity of the movable weight is controlled by the flow of fluid in and out of the piston rod end of the cylinder.

A fifth embodiment incorporates multiple cylinders as in the fourth embodiment in a extended shaft body. The piston rods extend and are fastened to a common weight. The cylinders are fluidly connected so that the fluid pressure is the same in both and two pistons move as one in response to fluid flow and centrifugal force. A simple linkage is used to assure a square movement of the exterior weight.

A sixth embodiment incorporates a movable cylinder body as the movable eccentric weight. The piston rod is fixed to the shaft body and the location of the cylinder body in relation to the axis of rotation is controlled by the flow of fluid through a piston rod passage. The piston rod is fixedly mounted to the shaft body.

A seventh embodiment incorporates a cylinder fixedly mounted on the shaft body. The piston rod is connected to linkage that controls the motion of dual pivoting weights. The piston, seals, and piston rod, linkage, pins and pivoting weight comprise the compound movable eccentric weight. The eccentricity or location of the center of gravity of the movable weight is controlled by the flow of fluid in and out of the piston end of the cylinder.

An eighth embodiment incorporates a cylinder pivotly mounted on the shaft body. The piston rod is pin connected to a pivoting weight. The piston, seals, piston rod, connecting pin and pivoting weight comprise the compound movable eccentric weight. The eccentricity or location of the center of gravity of the movable weight is controlled by the flow of fluid in and out of the piston rod end of the cylinder.

DESCRIPTION OF THE DRAWINGS

A more complete understanding of the invention may be had by reference to the following Detailed Description when taken in conjunction with the accompanying Drawings wherein.

DETAILED DESCRIPTION

Figure 1:
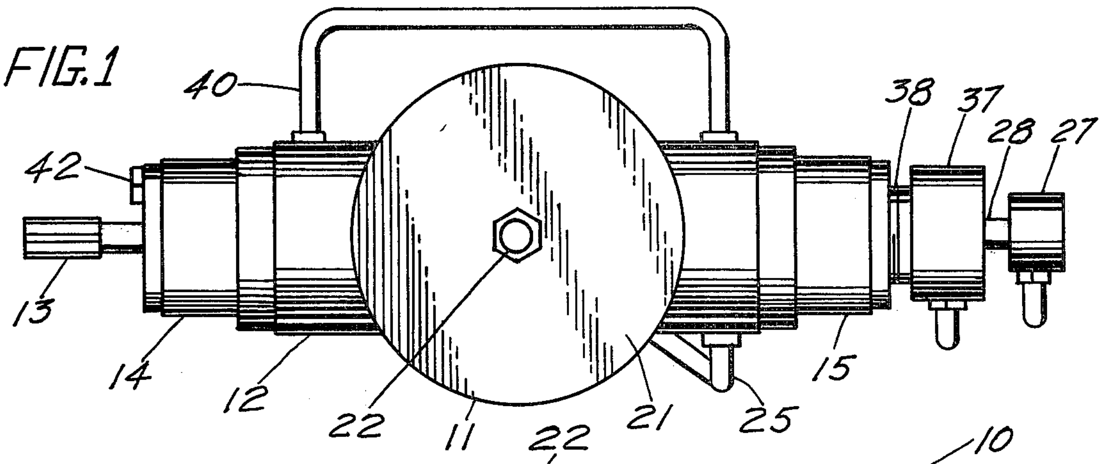
FIG. 1 is a top view of a variable eccentric mechanism except for the gauge means, valve means and pressure source means.
Figure 2:
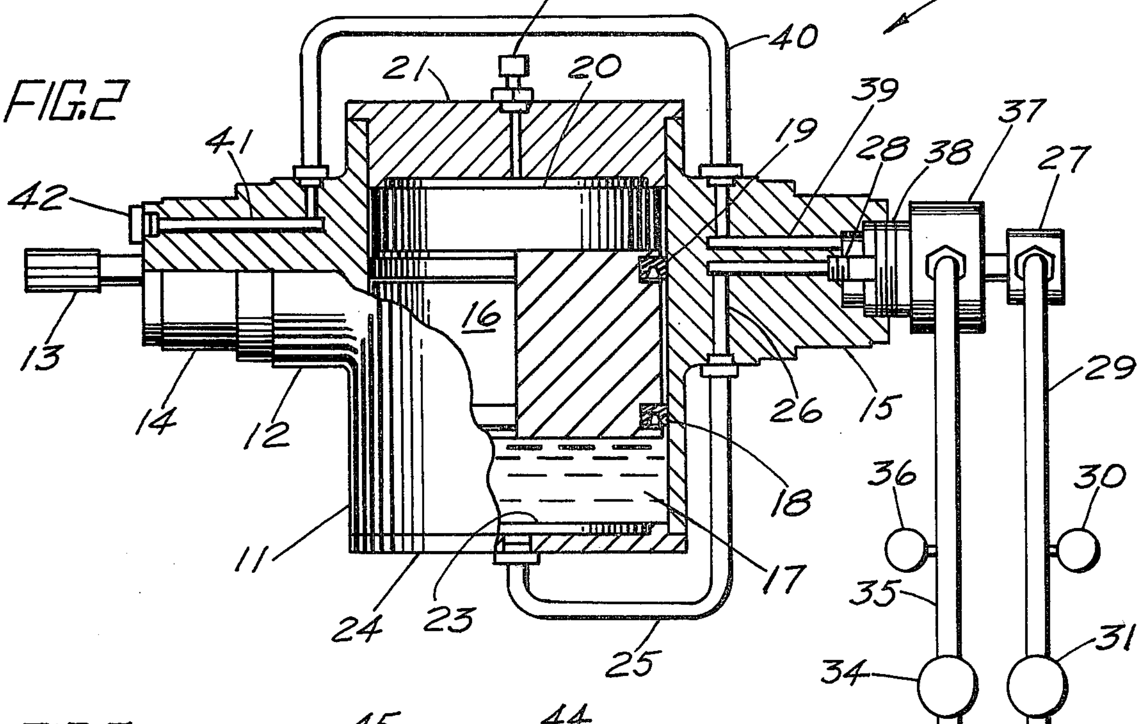
FIG. 2 is a side view of the mechanism shown in FIG. 1 partially sectioned with parts broken away to illustrate more clearly the construction of the invention. The sectioned view of the shaft has been rotated to provide a clear picture. connecting conduit is pictorially shown to connect with the rotated section.

Referring now to the drawings, FIGS. 1 and 2 show the same variable eccentric mechanism 10. The mechanism has a cylinder-like chamber 11 fastened to or being a part with shaft means 12. The shaft means has a drive means 13 shown in this embodiment as an integral splined shaft. The shaft means is journaled at 14 and 15 for the mounting of bearings.

The movable weight 16 is shown in an intermediate eccentric position. It is positioned and held by the fluid 17. Said weight is further positioned by the seals 18 and 19 which engage the weight and contact the interior surface of the chamber 11.

The minimum eccentricity of the mechanism is accomplished when said weight is forced against flange 20 of top cap 21. The eccentricity in this condition approaches zero. The cap 2 is equipped a breather 22 to avoid a pressure or vacuum resistance to the movement of the weight 16. The cap is fastened to the chamber by common means.

The maximum eccentricity of the mechanism is accomplished when said weight is forced against the flange 23 of the bottom cap 24 by gravity and/or centrifugal force.

The fluid 17 that forces and allows movement of the weight enters and leaves the chamber through conduit 25 which is fastened with common fittings to the bottom cap 24 and the bearing journal passage 26. Said passage is connected to rotary coupling 27 through the connecting part 28 that is fastened by common means to the shaft.

Fluid is transferred to and from the rotary coupling through the supply line 29. A pressure gauge 30 is installed by common means in the supply line. The reading on the gauge provides the unit pressure in the supply line, rotary coupling, bearing journal passage, conduit and chamber.

Valve means 31 is located in the supply line to stop the fluid flow and regulate the amount of fluid flow in or out of said chamber through the means provided.

Pressure source 32 provides pressurized fluid as required through the means provided to change the eccentricity.

In FIGS. 1 and 2 a second pressure source 33 is shown to be connected to a circuit similar to the one described previously but without a chamber and weight. Pressure source 33 provides pressurized fluid as required to change the eccentricity of another variable eccentric mechanism similar to the one shown. Fluid is furnished as required to the valve means 34, supply line 35, pressure gauge 36, fluid coupling 37 through connecting part 38 to bearing journal passage 39, through conduit 40 and into bearing journal passage 41. Plug 42 closes this passage when fluid flow is not required to change the eccentricity of another similar variable eccentric mechanism that is connected by common means to turn synchronously with the embodiment shown.

Figure 3:
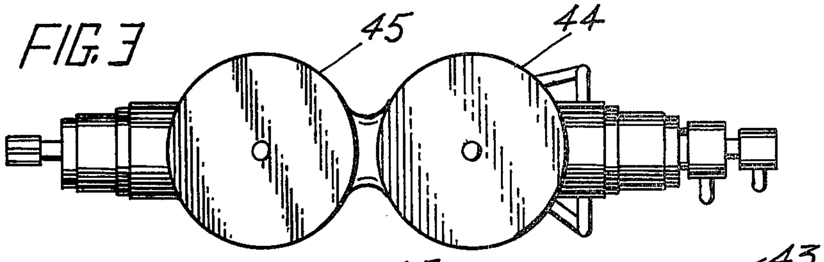
FIG. 3 is a top view of a variable eccentric mechanism incorporating another embodiment of the invention except for gauge means, valve means and pressure source means.
Figure 4:
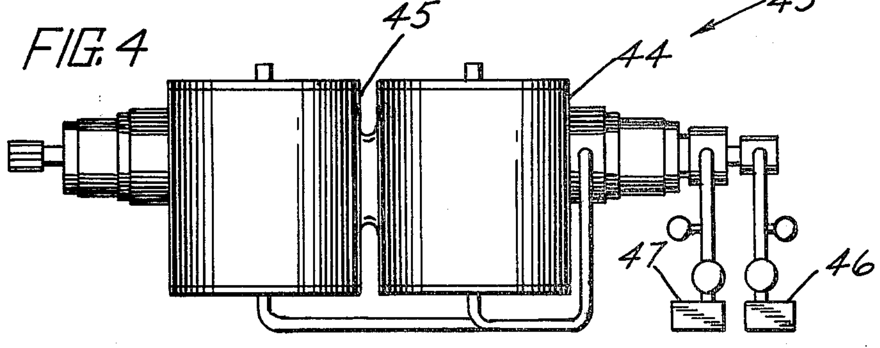
FIG. 4 is a side view of the mechanism shown in FIG. 3 including the gauge means, the valve means and the pressure source means.

With the second pressure source in mind let us refer to FIGS. 3 and 4. These show a variable eccentric mechanism 43 with two cylinder-like chambers 44 and 45, with a weight that is not shown disposed in each chamber. One pressure source 46, through the circuit provided, moves the weight in chamber 44 and the second pressure source 47 moves the weight in the second chamber 45. The circuitry is the same in embodiment 43 as in 10 except that second pressure source is used to move a second weight within the same mechanism rather than being passed on to a separate variable eccentric mechanism.

FIGS. 1 and 2 show the preferred embodiment. It is preferred because of the versatility evident in the ability to pass control fluid to and from another vibration generating mechanism. Two vibration generating mechanisms often have an advantage because they can develop a synchronized force whose effect can be divided between four supporting bearings rather than two. The obvious advantage is an increase in the life of the bearings. When bearing loads and bearing life are not a problem and enough centrifugal force can be developed from a single movable weight a single passage through one bearing housing and a single rotary coupling would be a more economical mechanism to produce. In that event, pressure source 33, valve means 34, supply line 35, gauge means 36, rotary coupling 37 with its connecting part 38, passage 39, conduit 40, passage 41 and plug 42 would not be used.

In the zero eccentricity mode the mechanism is balanced by the distribution of weight of the total mechanism. The center of gravity of the weight is slightly below the center line of the bearing journals so that it will tend to move radially outward when the shaft is rotating.

It is noted in FIG. 2 that the top cap 21 is much thicker than the bottom cap 24. In this manner it not only serves as a stop in the zero eccentricity mode but counter balances the weight of the chamber that extends further below than above the centerline of the bearing journals.

The eccentricity is increased by using the valve means to allow fluid to flow from the chamber. This allows the weight to assume a more off center position. To decrease the eccentricity the valve means is used to regulate a flow of pressurized fluid into the chamber. This forces the weight toward the center line of the bearing journals.

When the eccentricity is increased at any given rotational speed the centrifugal force and amplitude are increased. Conversely when the eccentricity is decreased at any given rotational speed the centrifugal force and amplitude are decreased. Vibrational amplitude is adjustable from zero to a predetermined value at all effective rotational speeds.

This change in force will register on the pressure gauge as an increase or decrease in pressure. Since the shape of the movable weight is known the pressure will indicate the force through direct conversion. Force Pressure x Area. The weight is offset from the axis of rotation even when the mechanism is balanced. Pressure will always be generated except when the weight is in its maximum eccentric position and its movement is resisted by a mechanical stop rather than by the presence of fluid and fluid pressure. The fluid pressure will be zero under that condition. At that point the eccentricity of the center of gravity of the movable weight is known and the centrifugal force will vary directly with the second power of the rotational speed. The pressure source will be chosen to be able to develop adequate pressure to force the weight away from the stop back toward the axis of rotation when a reduction in force and eccentricity is desired. In larger mechanisms fluid weight may be significant in calculating the generated centrifugal force. The weight of fluid will always be considered to assure a balanced mechanism in the zero eccentricity mode.

Figure 5:
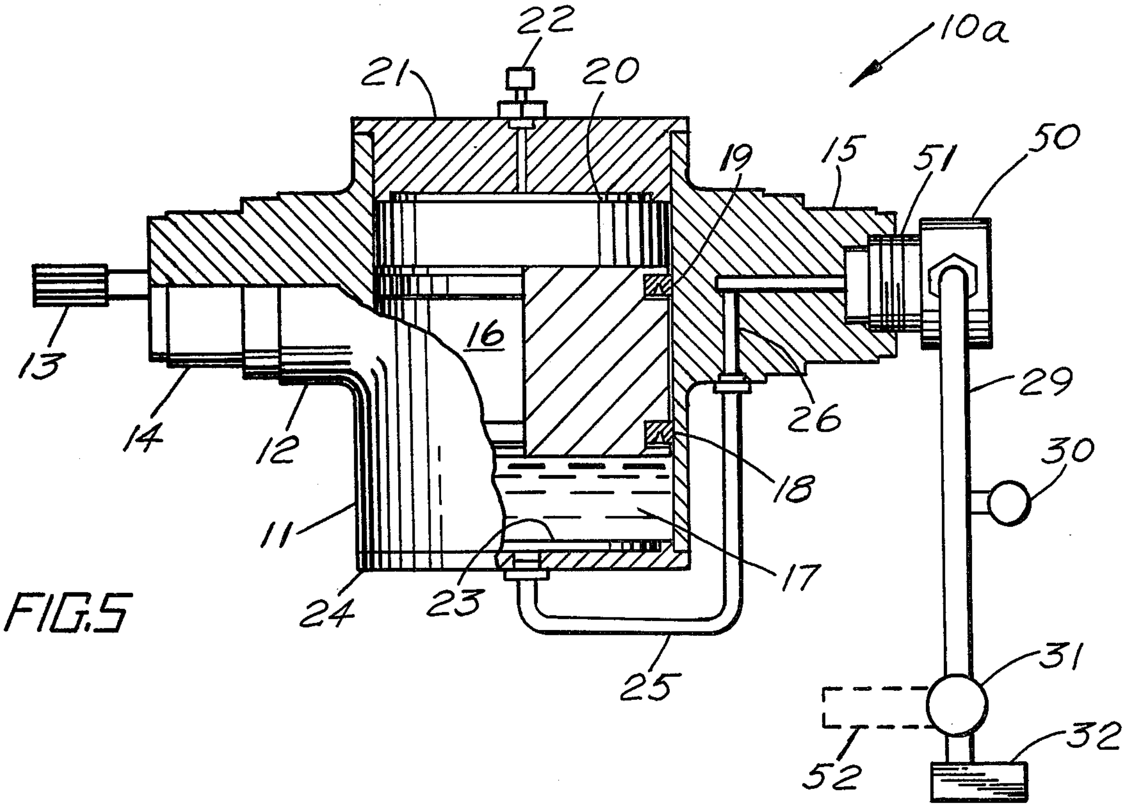
FIG. 5 is a side view of another embodiment partially sectioned to illustrate more clearly the construction of the invention.

Turning to FIG. 5 there is shown a modification of the mechanism 10 shown in FIGS. 1 and 2. The mechanism 10*a* incorporates a simple rotary fluid coupling 50 fastened by connecting part 51 to the bearing journal 15 end in place of the duplex rotary fluid coupling made up of parts 27, 28, 37, and 38 shown in FIGS. 1 and 2. The simple rotary fluid coupling allows for a single fluid circuit to pass to the mechanism 10*a* while the duplex rotary fluid coupling allows for two separate fluid circuits to pass to mechanism 10.

Continuing in FIG. 5 the mechanism 10*a* incorporates single supply line 29 connected to pressure source 32, valve means 31, pressure gauge 30 and body of the rotary coupling 50. Control means 52, an optional device, is shown in dashed lines, as a part of and adapted to valve means 31. This control means is pressure sensitive to the pressure in the cylinder through the connecting circuit. The control operates the valve means to allow flow in or out of the cylinder. This flow maintains or limits the pressure in the circuit by positioning the movable weight. The control is readily adjustable either manually or by remote control means.

The pressure source 32 is one of various types common in the art that supplies pressurized fluid as required to force the weight to a less eccentric position.

Continuing again in FIG. 5 the mechanism contains movable weight 16, and other features and parts found in the mechanism 10 shown in FIGS. 1 and 2. The zero eccentricity mode and the maximum eccentricity are achieved in the same manner as previously described.

The mechanism 10*a* shown in FIG. 5 and subsequent mechanisms show the cylinder means as an integral part of a cast or forged shaft body. It is understood to those skilled in the art that the shaft body may be a weldment including the cylinder means. The cylinder means may also be a separate replaceable piece commonly fastened to a cast, forged or fabricated shaft body.

The mechanism is drivenly rotated through drive means 13. Drive means 13 is shown as an external spline. Drive means such as internal splines, shaft and key or other conventional structure may be used.

Figure 6:
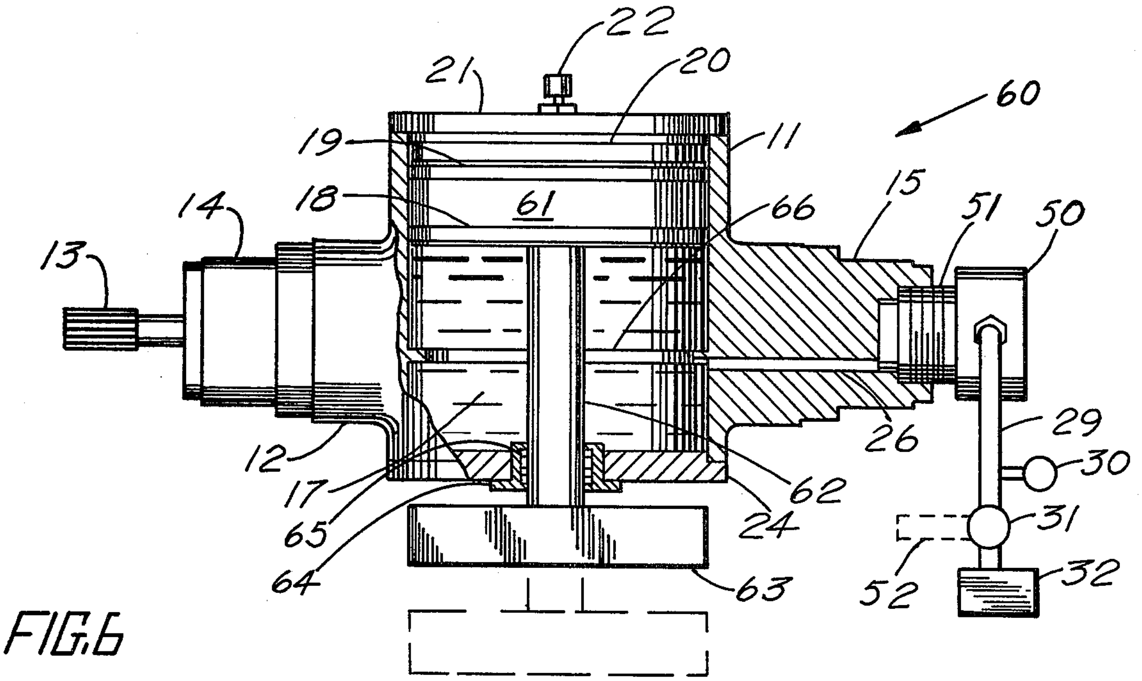
FIG. 6 is a side view of another embodiment of the invention partially sectioned to illustrate more clearly the construction of the invention.

FIG. 6 describes a mechanism 60 which includes a compound movable eccentric weight. Piston 61, seals 18 and 19, piston rod 62, and exterior weight 63 comprise the compound movable eccentric weight. When the piston 61 is located against the flange 20 of cap 21 the mechanism is essentially balanced and the eccentricity is zero. The center of gravity of the movable weight at the same time is offset towards the cap 24 and flange 66. Flange 66 acts as a stop to limit the travel of the piston which limits the maximum eccentricity. Because the center of gravity of the movable weight is offset it tends to move in the direction of the cap 24. This movement is resisted and restricted by fluid 17 that fills the cylinder below the piston 61 and around the rod 62 as shown. The weight and location of the fluid is considered in calculating balance and centrifugal force. The fluid will restrict the movement until valve means 31 allows fluid to flow from the cylinder 11 through the bearing journal passage 26, through the rotary coupling made of parts 50 and 51, and supply line 29.

In the mechanism 60 shown in FIG. 6 the fluid 17 enters and leaves the cylinder 11 through the bearing journal passage 26 at a point below the top of flange 66.

Control means 52, an optional device, is shown in dashed lines, as a part of and adapted to valve means 31. This control means is pressure sensitive to the pressure in the cylinder through the connecting circuit. The control operates the valve means to allow flow in or out of the cylinder. This flow maintains or limits the pressure in the circuit by positioning the movable weight. The control is readily adjustable either manually or by remote control means.

The pressure source 32 is one of various types common in the art that supplies pressurized fluid as required to force the weight to a less eccentric position.

The eccentricity of the compound weight is adjustable in the same manner as the eccentricity of the weights in mechanism 10 shown in FIGS. 1 and 2. The exterior weight 63 and part of the piston rod 62 are shown in broken lines in a second position to depict a more eccentric position.

The radial movement of the compound weight is slidingly guided by the piston seals 18 and 19 fixed to piston 61 sliding in the cylinder 11 and the sliding contact between the piston rod 62 and the packing 65 fixed in the packing flange 64 which is fastened to cap 24.

The breather 22 in cap 21 avoids a pressure or vacuum resistance to movement of this piston 61 with seals 18 and 19 within the cylinder.

The mechanism is drivenly rotated through drive means 13. Drive means 13 is shown as an external spline. Drive means such as internal splines, shaft and key or other conventional structure may be used.

Figure 7:
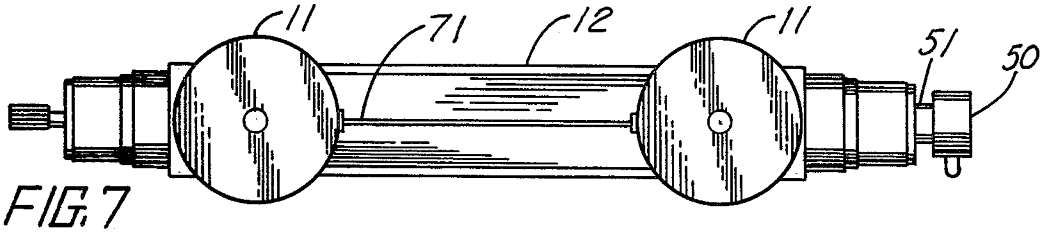
FIG. 7 is a top view of another embodiment of the invention except for gauge means, valve means, optional control means and pressure source means.
Figure 8:
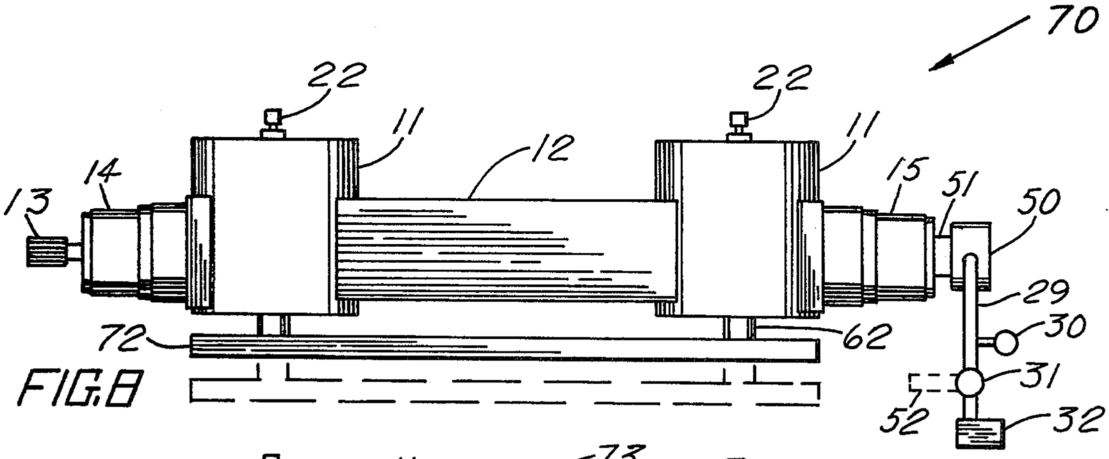
FIG. 8 is a side view of the embodiment shown in FIG. 7.
Figure 9:
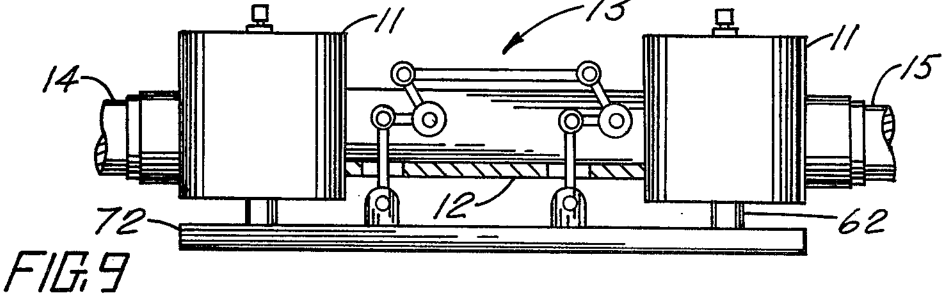
FIG. 9 is a side view of the embodiment shown in FIGS. 7 and 8 with parts broken away and partially sectioned showing linkage parts of the embodiment which are not shown in FIGS. 7 and 8.

FIGS. 7, 8 and 9 picture another embodiment of the invention. The mechanism 70 has many primary parts that are like those in mechanism 60. Mechanism 70 has an elongated U shaped shaft body 12 which accomodates two cylinders 11. An elongated exterior weight 72 shown in FIGS. 8 and 9 is fastened to the piston rods 62 from each of the two cylinders. The fluid circuitry is the same except that the two cylinders are fluidly connected by conduit 71 and common fittings (not itemized) shown in FIG. 7. The cylinder 11 in proximity to the rotary coupling 50 is connected with the pressure source 32 as in mechanism 60.

FIG. 9 shows linkage 73 (not shown in FIGS. 7 and 8) that is used in synchronizing the movement of the piston rods 62. The action is obvious to those skilled in the art. The linkage comprises bell cranks pivotly pin connected to the shaft body 12 with pivotal connections to push-pull rods and with the rods being pivotly connected to brackets on the exterior weight. Even though the pressures in the two cylinders are intended to be the same through a common circuit variable resistances between the seals and cylinders and between packings and rods in the sliding action would tend to make one rod move more easily than the other and the elongated weight could move in and out in a position not parallel to the axis of rotation and offer an unpredictable action. It will be understood by those skilled in the art that other apparatus such as gearing, pulleys and cable etc. could be used to synchronize the movement of the rods 62.

The position of the compound movable weight, which includes two sets of seals, pistons, piston rods and exterior weight 72, is controlled through the flow of fluid in and out of the piston rod ends of the cylinders. The flow in and out of the cylinders is controlled by valve means 31 through supply line 29. The pressure sensitive control 52, shown in dashed lines as an option attached to valve means 31, may be used to actuate the valve means 31 controlling the flow of fluid to position the movable weight and regulate the generated centrifugal force.

The pressure source 32 is one of various types common in the art that supplies pressurized fluid as required to force the weight to a less eccentric position.

One of the objectives of the mechanism shown in this embodiment is to provide an elongated mechanism to vibrate a body that has an elongated distance between means to mount bearings in support of the mechanism. Another objective is to divide the resistance to the generated force between two cylinders. In this way the maximum pressure in the cylinders can be halved and the beam loading of the shaft body is such to reduce the maximum bending moment, stresses and deflection of the shaft body. It is understood that more than two cylinders could be used in this embodiment to increase the generated force rating and/or to reduce the fluid pressure requirement.

The mechanism is drivenly rotated through drive means 13. Drive means 13 is shown as an external spline. Drive means such as internal splines, shaft and key or other conventional structure may be used.

Figure 10:
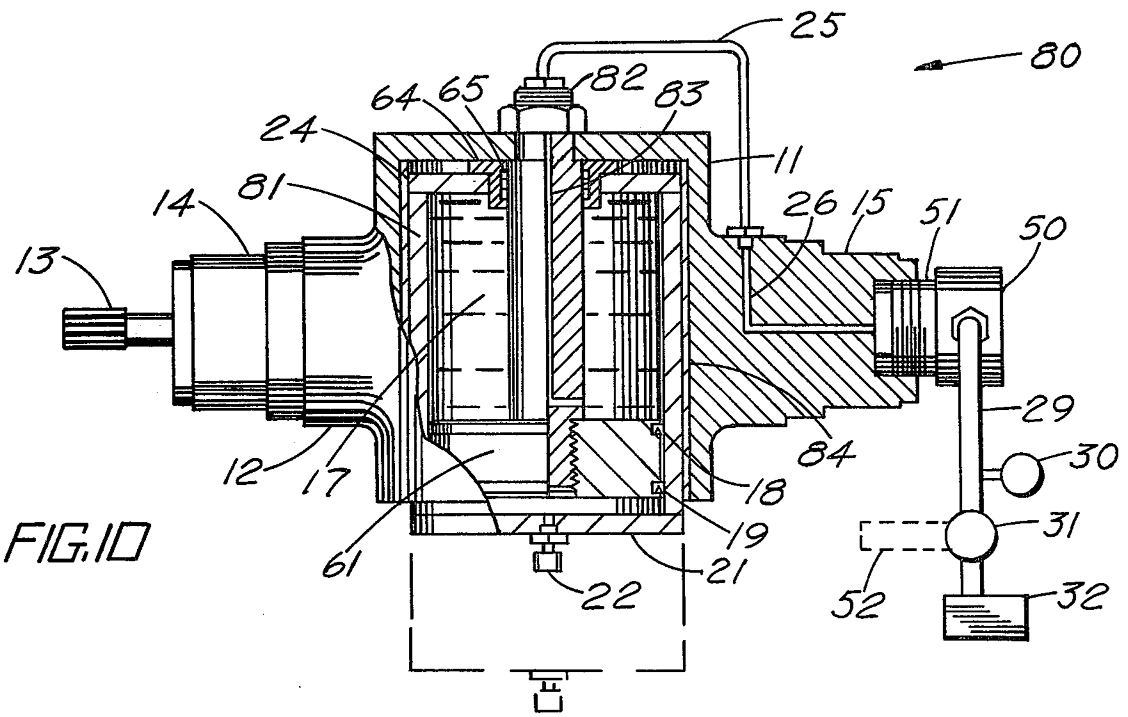
FIG. 10 is a side view of another embodiment of the invention partially sectioned to illustrate more clearly the construction of the invention.

FIG. 10 depicts another embodiment of the invention. Mechanism 80 shows a cylinder with attaching parts as the movable eccentric weight. The cylinder is made of barrel 81, cap 24, packing gland 64, packing 65, cap 21 and breather 22. The cylinder is shown in the zero eccentricity mode. The mechanism is essentially balanced with the cylinder in this position. The center of gravity of the cylinder however is slightly off center in the direction of the piston and when the mechanism is rotated it tends to move outwardly in said direction. The broken lines show the cap and breather end when the center of gravity of the cylinder is in a more off center location.

Piston rod 82 is shown fixed to the integral cap of cylinder means 11. It is understood that the cap could be a separate part fastened to the open ended cylinder. The cylinder means 11 is shown as an integral part of shaft body 12. It is understood further that this cylinder means could be a separate part fastened to the shaft body as discussed previously herein. The rod 82 is shown threadly fastened to piston 61. The rod, piston and seals have a fixed position. When the flow of the fluid 17 is allowed out of the cylinder body by valve means 31 through the piston rod fluid passage 83, conduit 25, bearing journal passage 26, connecting part 51, rotary coupling 50 and supply line 29 the cylinder which is the movable weight described earlier moves outwardly slidingly guided by the packing 65 on the piston rod 82, the seals 18 and 19 on the interior of the cylinder barrel 81 and the liner 84 on the outside of the cylinder barrel. The liner 84 is a tight fit in the cylinder means 11 and a loose fit about the outside of the barrel. Other means of construction could be used. The outside of the cylinder barrel 81 or the inside of the cylinder means 11, or both could be treated with an anti-friction coating instead of using liner 84. The choice of liner or protective coating is left to the designer in evaluating the individual application.

In order to decrease the centrifugal force for any given vibrational speed fluid from the pressure source is directed through the valve means 31, supply line 29, rotary coupling 50, connecting part 51, bearing journal passage 26, conduit 25, piston rod passage 83 into the cylinder which is the movable weight. The weight and location of the fluid is considered in calculating balance and centrifugal force. The fluid pressure against the cap 24, packing gland 64, packing 65 moves the weight inward towards the zero eccentricity mode in a regulated manner.

The pressure recorded by gauge means 30 is related directly to the centrifugal force being generated as the mechanism is rotated by the formula, Force = Pressure × Area. The Area in this instance is the surface of cap 24, packing gland 64, and packing 65 in contact with fluid 17.

The mechanism is drivenly rotated through drive means 13. Drive means 13 is shown as an external spline. Drive means such as internal splines, shaft and key or other conventional structure may be used.

The pressure sensitive control 52, shown in dashed lines as an option attached to valve means 31 may be used to actuate the valve means 31 controlling the flow of fluid to position the movable weight and regulate the generated centrifugal force. The valve can be set up without the pressure sensitive control to be operated manually or remotely through cable, electrical or fluid control means depending upon the various application circumstances.

The pressure source 32 is one of various types common in the art that supplies pressurized fluid as required to force the weight to a less eccentric position.

Figure 11:
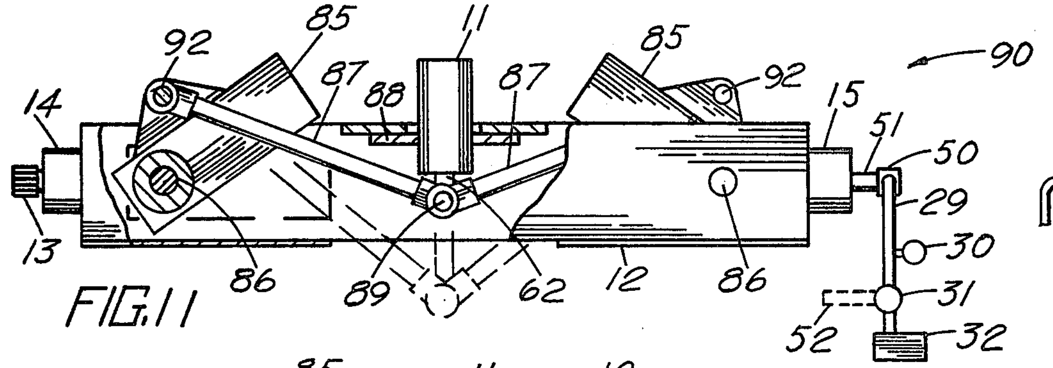
FIG. 11 is a side view of another embodiment with parts broken away and partially sectioned to illustrate more clearly the construction of the invention.
Figure 12:
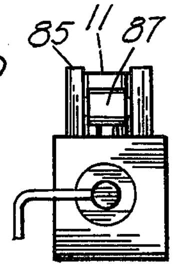
FIG. 12 is an end view of the embodiment shown in FIG. 11 except for the gauge means, valve means, optional control means and pressure source.
Figure 13:
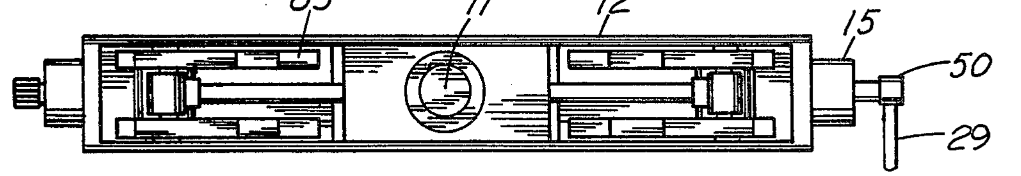
FIG. 13 is a top view of the embodiment shown in FIG. 11 and FIG. 12 except for the gauge means, valve means, optional control means and pressure source.

FIGS. 11, 12 and 13 show another embodiment. The mechanism has pressure source, control means, pressure gauge and circuit as described previously in the foregoing embodiment descriptions. The bearing journal passage and conduit to the piston side of the cylinder are not shown. The breather in the piston rod end of the cylinder is understood but not shown.

In the mechanism 90 dual pivoting weights 85 are pivotally connected by pins 86 to shaft body 12. The pivot pins are located generally perpendicular to the axis of rotation. The weights are clevis shaped and pin connected by pins 92 to push-pull rods 87. These push-pull rods being connected at a common joint with the boss of the extended piston rod 62. The three pieces are commonly connected by pin 89. The weights pivot as the piston rod moves in and out.

Broken lines show the outline of one of the weights, some of the linkage and piston rod in the zero eccentricity mode wherein the mechanism is essentially balanced.

The cylinder 11 is fixedly mounted to the shaft body 12 by means of flange 88. The cylinder piston rod extends and retracts radially, generally perpendicular to the axis of rotation.

It will be recognized by those skilled in the art that the cylinder shown or other types of cylinders could be mounted in a variety of attitudes using different mounting techniques without departing from the spirit of the invention.

The weights, rods, pins, piston rod, seals, (not shown) piston, (not shown) make up the compound eccentric weight. When these parts are situated in the zero eccentricity mode indicated by the broken lines as noted they tend to move to an eccentric position shown clearly in FIG. 11. Their position and the generated centrifugal force is regulated as previously discussed.

It is noted that all of the centrifugal force generated as the mechanism is rotated is not transmitted through fluid pressure in the cylinder to the shaft body. The majority of the force is transmitted to the shaft body through weight-shaft pivot pins 86. It is one of the objectives of this embodiment to provide a mechanism with large capacity with a relative low fluid pressure. As in the other embodiments; the weight, shape and geometry of the movable parts is known. The pressure in the cylinder can be directly related to the total centrifugal force. Centrifugal force calculations are made for multiple positions of the compound eccentric weight. Interpolation is used to know the force values for the infinite number of positions available.

Control means 52, an optional device, is shown in dashed lines, as a part of and adapted to valve means 31. This control means is pressure sensitive to the pressure in the cylinder through the connecting circuit. The control operates the valve means to allow flow in or out of the cylinder. This flow maintains or limits the pressure in the circuit by positioning the movable weight. The control is readily adjustable either manually or by remote control means.

The pressure source 32 is one of various types common in the art that supplies pressurized fluid as required to force the weight to a less eccentric position.

Figure 14:
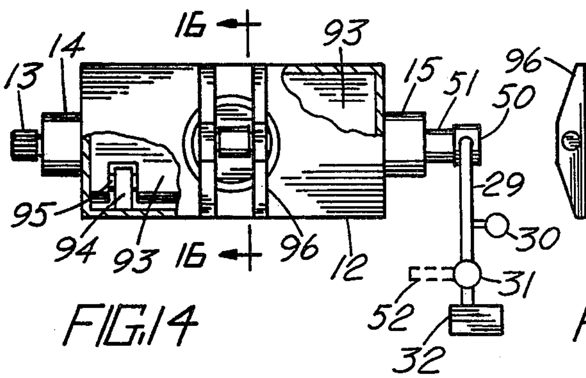
FIG. 14 is a side view of another embodiment with parts broken away and partially sectioned to illustrate more clearly the construction of the invention.
Figure 15:
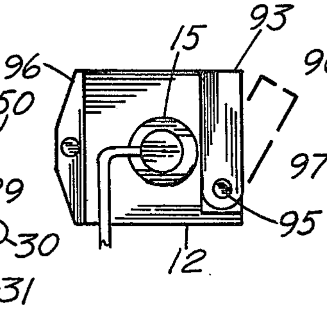
FIG. 15 is an end view of the embodiment shown in FIG. 14 except for the gauge means, valve means, optional control means and pressure source.
Figure 16:
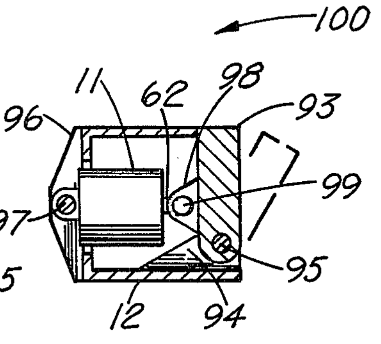
FIG. 16 is a sectional view taken generally along the line 16—16 in FIG. 14 is the direction of the arrows.

FIG. 14, 15 and 16 show another embodiment. The mechanism has a pressure source, control means, pressure gauge and circuit as described previously in the foregoing embodiment descriptions. The bearing journal passage and conduit to the piston rod side of the cylinder are not shown. The breather in the piston end of the cylinder is understood but not shown.

The mechanism is drivenly rotated through drive means 13. Drive means 13 is shown as an external spline. Drive means such as internal splines, shaft and key or other conventional structure may be used.

In the mechanism 100 the pivoting weight 93 is pin connected to hinges 94 of the shaft body 12 by pins 95. Pins 95 are located generally parallel to the axis of rotation. The weight 93 is shown in all three figures in its zero eccentricity mode wherein the mechanism is essentially balanced.

The cylinder 11 is shown pivotly mounted to the shaft body hinge brackets 96 by pin 97. The cylinder piston rod 62 is pivotly connected to weight hinge brackets 98 by pin 99. As the flow of fluid to and from the piston rod side of the cylinder moves the piston rod in and out it controls the position of the weight 93. The breather for the cylinder is not shown. Broken lines outline an eccentric position of the pivoted weight in FIGS. 15 and 16.

The weight 93, pin 99, rod 62, piston (not shown) and seals (not shown) make up the compound eccentric weight. When these parts are situated in the zero eccentricity mode shown in FIGS. 15 and 16 and the mechanism is balanced they tend to move to an eccentric position typified by the broken line outline of the weight in FIGS. 15 and 16. The cylinder and rod pivot as the rod moves in and out describing a plane perpendicular to the axis of rotation. The position of the weights and the generated centrifugal force is regulated as previously discussed.

It is noted that in this embodiment as in mechanism 90, that all of the centrifugal force generated is not transmitted through the fluid pressure to the shaft body and bearing journals. The hinges 94 transmit some force directly to the shaft body and thus to the bearing journals. As before with all things being known the pressure in the cylinder can be directly related to the total centrifugal force generated at any eccentric weight position and any vibratory speed.

Control means 52, an optional device, is shown in dashed lines, as a part of and adapted to valve means 31. This control means is pressure sensitive to the pressure in the cylinder through the connecting circuit. The control operates the valve means to allow flow in or out of the cylinder. This flow maintains or limits the pressure in the circuit by positioning the movable weight. The control is readily adjustable either manually or by remote control means.

The pressure source 32 is one of various types common in the art that supplies pressurized fluid as required to force the weight to a less eccentric position.

The foregoing embodiments describe novel variable eccentric vibration generating mechanisms. An important advantage of the mechanisms is the ability to increase or decrease force without changing the vibrational speed. Vibration can be eliminated without stopping the shaft or changing the rotational speed. Other devices that can vary the force without changing the speed are available but they use liquids for the movable weight. The liquids are forced from one chamber to another by pneumatic and hydraulic means. The chambers and their arrangement are especially bulky. Specific reference is made to U.S. Pat. No. 3,616,730, Nov. 2, 1971, by Boone, Fridley, and Bush (U.S. Cl. 94-50V).

The variable eccentric mechanisms (VEMECH) can be built in a more compact package and at less cost. The size of the package is important because it adds to the versatility of the invention. It makes the invention adaptable in relatively restricted spaces. It is also available in elongated forms as required. In addition the more compact units have less inertia or flywheel effect and require less torque to start and stop and less horsepower to accelerate. The optional pressure sensitive control means is extremely valuable in selected applications. The most important feature of the invention is the ability to record the pressure caused by the rotating eccentric weight and relate this to the centrifugal force being generated. The knowledge of the value of centrifugal force will help in vibrational amplitude regulation and matching vibrational effort to the assigned work. The most productive force value can be repeated accurately without guess work or unnecessary delay. This visible record of the generated centrifugal force through conversion of the pressure recording is not available on any other device known to the inventor. Another advantage is the variety of pressure sources listed previously as hydraulic pumps, air compressors, hydraulic cylinder and grease gun that may be used as the application circumstance dictates. Other advantages of this invention will be obvious to those skilled in the art.

Preferred embodiments of the invention have been illustrated in the accompanying Drawings and described in the foregoing Detailed Description and Summary. It will be understood that the invention is not limited to the embodiments shown and described.

What is claimed is:

1. A rotatable variable eccentric vibration generating mechanism wherein the improvement comprises a movable eccentric weight that is variably positioned by a controlled flow of fluid;

said mechanism including shaft body means between opposed bearing journals;

said mechanism including drive means on one end;

said mechanism including a fluid passage through said bearing journal on the opposed end;

said mechanism including a rotary fluid coupling fastened in part to said opposed end of the rotatable mechanism and fluidly connected with said bearing journal passage;

said mechanism including cylinder means;

said cylinder means fluidly connected with said bearing journal passage;

said mechanism including a fluid supply line connected to said rotary coupling;

said mechanism including a pressure gauge connected fluidly to record pressure in said cylinder means, passages, rotary coupling, supply line, and common parts;

said pressure record being convertible by computation to generated centrifugal force;

said mechanism including valve means to regulate the flow of fluid in and out of said supply line, rotary coupling, passages, cylinder means and common parts;

said flow of fluid controlling the position of the movable eccentric weight;

said regulation of flow and positioning of the movable eccentric weight being used to adjusted pressures within the cylinder means as required;

said mechanism including means to supply pressurized fluid;

said fluid supply line being also connected with pressure gauge means, valve means and pressure source means.

2. A rotatable variable eccentric vibration generating mechanism as in claim 1 further comprising:

said cylinder means being a part of said shaft body;

said cylinder having caps on each end;

said cylinder means including a breather vent in one of said caps;

said cap on opposing end contains fluid port adaptable to common fittings;

said mechanism including a movable eccentric weight totally inclosed in said cylinder means;

said weight being slidingly supported by said cylinder means bore through common seal means;

said weight having a center of gravity offset from the axis of rotation causing it to tend to move away from the axis of rotation when the mechanism is rotated;

said offset being in the direction of the fluid port of said cylinder means;

said movement of said weight being resisted by fluid within said cylinder means on the fluid port end;

said fluid port end being fluidly connected by common fittings and conduit to said bearing journal passage.

3. Said mechanism as in claim 2 wherein pressure sensitive controls means are a part of said valve means.

4. A rotatable variable eccentric vibration generating mechanism wherein the improvement comprises a movable eccentric weight that is variably positioned by a controlled flow of fluid;

said mechanism including shaft body means between opposed bearing journals;

said mechanism including drive means on one end;

said mechanism including dual fluid passages adaptable to common fittings through said bearing journal on the opposed end;

said mechanism including a fluid passage adaptable to common fittings through the bearing journal on the drive means end;

said mechanism including a duplex rotary fluid coupling fastened in part to said opposed end of the rotatable mechanism and fluidly connected to said dual fluid passages through said bearing journal;

said mechanism including cylinder means as a part of said shaft body;

said cylinder having caps on each end;

said cylinder means including a breather vent in one end;

said cylinder having a fluid port adaptable to common fittings on the opposing end;

said mechanism including a movable eccentric weight totally inclosed in said cylinder means;

said weight being slidingly supported by said cylinder means bore through common seal means;

said weight having a center of gravity offset from the axis of rotation causing it to tend to move away from the axis of rotation when the mechanism is rotated;

said offset being in the direction of said fluid port in said cylinder means;

said movement of said weight being resisted by fluid within said cylinder means on the fluid port end;

said fluid port end being fluidly connected by common fittings and conduit to one of said dual passages through said bearing journal;

said fluid passage through said bearing journal on drive means end being fluidly connected by common fittings and conduit to one of said dual passages through said bearing journal;

said mechanism including dual fluid supply lines connected to said duplex rotary coupling;

said mechanism including pressure gauges connected fluidly to record pressures in said cylinder means, passages, rotary coupling, supply lines and common parts;

said pressure records being convertible by computation to generated centrifugal force;

said mechanism including second valve means to regulate the flow of fluid in and out of second supply line, rotary coupling, passages, conduit and fluid passage through bearing journal on said drive means end;

said flow of fluid through first valve means controlling the position of the movable eccentric weight;

said regulation of said flow being used to adjust pressures within the cylinder as required;

said flow of fluid through the second valve means and the bearing journal on said drive means end controlling the position of a movable eccentric weight being part of a rotatable variable eccentric vibration generating mechanism operating synchronously with said rotatable variable eccentric vibration generating mechanism;

said mechanism including means to supply pressurized fluid;

said fluid supply lines being connected with pressure gauge means, valve means and pressure source means;

5. Said mechanism as in claim 4 wherein pressure sensitive controls means are a part of said valve means.

6. A rotatable variable eccentric vibration generating mechanism wherein the improvement comprises movable eccentric weights that are variably positioned by controlled flows of fluid;

said mechanism including shaft body means between opposed bearing journals;

said mechanism including drive means on one end;

said mechanism including dual fluid passages, adaptable to common fittings, through said bearing journal on the opposed end;

said mechanism including a duplex rotary fluid coupling fastened in part to said opposed end of the rotatable mechanism and fluidly connected to said dual fluid passages through said bearing journal;

said mechanism including dual cylinder means as a part of said shaft body;

said cylinders having caps on each end;

said cylinder means including a breather vent in one end;

said cylinder having a fluid port adaptable to common fittings on the opposing ends;

said mechanism including movable eccentric weights totally inclosed in said cylinder means;

said weights being slidingly supported by said cylinder means bore through common seal means;

said weights having a center of gravity offset from the axis of rotation causing them to tend to move away from the axis of rotation when the mechanism is rotated;

said offsets being in the direction of said fluid ports in said cylinder means;

said movement of said weights being resisted by fluid within said cylinder means on the fluid port ends;

said fluid port ends being separately fluidly connected by common fittings and conduits to said dual passages through said bearing journal;

said mechanism including dual fluid supply lines connected to said duplex rotary coupling;

said mechanism including pressure gauges connected fluidly to record pressures in said cylinder means, passages, rotary coupling, supply lines and common parts;

said pressure records being convertible by computation to generated centrifugal force;

said mechanism including separate valve means to regulate the flows of fluid in and out of said supply lines, rotary coupling, passages, cylinder means and common parts;

said flows of fluid controlling the position of the movable eccentric weights;

said regulation of flows being used to adjust pressures within the dual cylinders as required;

said mechanism including means to supply pressurized fluid;

said fluid supply lines being connected with pressure gauge means, valve means and pressure source means.

7. Said mechanism as in claim 6 wherein pressure sensitive controls means are a part of said valve means.

8. A mechanism as in claim 1 with a cylinder means being a part of said shaft body;

said cylinder being capped on both ends and including piston, piston sealing devices, piston rod and piston rod packing;

said piston rod packing joining the piston rod and packing gland which is commonly fastened to one of said end caps;

said piston rod extending through said packing gland and said cap;

said cylinder means including a breather vent in the opposing end;

said piston rod fastened by common means to a movable weight part on the outside of said cylinder means;

said piston, sealing devices, piston rod, and movable weight part being a compound eccentric weight;

said eccentric weight is slidingly supported by the cylinder means bore and piston rod packing and made to move in a generally radial direction;

said compound movable eccentric weight having a center of gravity offset from the axis of rotation of said mechanism causing it to tend to move away from said axis of rotation when the mechanism is rotated;

said movement being resisted by fluid within said cylinder means on the piston rod end;

said cylinder being fluidly connected on the piston rod end to said rotary coupling by means of said passage through said bearing journal.

9. Said mechanism as in claim 8 wherein pressure sensitive controls means are a part of said valve means.

10. A mechanism as in claim 1 with an extended shaft body with multiple cylinder means being a part of said shaft body;

said multiple cylinders means located in the same general radial direction relative to the axis of rotation of said mechanism and symetrically along the length of said shaft body;

said cylinders being capped on both ends and including pistons, piston sealing devices, piston rod and piston rod packing;

said piston rod packing joining the piston rods and packing glands which are commonly fastened to one of said end caps;

said piston rods extending through said glands and said caps on one end;

said cylinder means including breather vents in the opposing ends;

said piston rods fastened by common means to a single elongated movable weight part on the outside of said multiple cylinder means;

said pistons, sealing devices, piston rods, and elongated movable weight part being a compound eccentric weight, is slidingly supported by the cylinder means bores and piston rods packing to move in a generally radial direction;

said compound eccentric weight having a center of gravity offset from the axis of rotation of said mechanism causing it to tend to move away from said axis of rotation when the mechanism is rotated;

said mechanism including linkage to synchronize the movement of the piston rods;

said movement being resisted by fluid within said cylinder means on the piston rod ends;

said cylinder means being fluidly connected one to the other on the piston rod ends by means of common fittings and conduit;

said cylinder means located in proximity to said rotary coupling being fluidly connected to said rotary coupling by means of said passage through said bearing journal.

11. Said mechanism as in claim 10 wherein pressure sensitive controls means are a part of said valve means.

12. A mechanism as in claim 1 with open end cylinder means being a part of said shaft body;

said open end cylinder being capped one end;

said mechanism including second cylinder means with caps, breather vent, piston rod, rod packing, gland, piston, piston seals, and barrel;

said barrel, caps, breather vent, and packing gland being movable weight means;

said movable weight is slidingly supported and guided by said open end cylinder means;

said movable weight is further slidingly supported and guided by said piston through the piston seals;

said movable weight is further slidingly supported and guided by said piston rod through said piston rod packing;

said piston rod is threadedly fastened to said cap of said open end cylinder means;

said piston rod has a fluid passage to allow the cylinder means to be filled with fluid;

said piston rod passage is fluidly connected through common fittings and conduit to said bearing journal passage;

said movable weight having a center of gravity offset from the axis of rotation of said mechanism causing it to tend to move away from said axis of rotation of said mechanism when the mechanism is rotated;

said movement being resisted by fluid within said cylinder means on the piston rod end.

13. Said mechanism as in claim 12 wherein pressure sensitive controls means are a part of said valve means.

14. A mechanism as in claim 1 with an extended shaft body and cylinder means mounted generally equidistant from said bearing journals;

said cylinder means having a piston and piston rod;

said cylinder means including a breather vent on the piston rod end;

said piston rod extends and retracts radially generally perpendicular to the axis of rotation;

said piston rod having a connecting boss on the extended end;

said connecting boss being fastened pivotally to a pair of generally symetrical links;

said links are pin fastened pivotally to pivoting movable weights;

said movable weights pivot about pins mounted in said extended shaft body generally perpendicular to the rotational axis of said mechanism;

said movable weights, link-weight pivot pins, links, link-rod pin, rod and piston means and common parts comprising a compound movable eccentric weight;

said compound movable eccentric weight having a center of gravity offset from said axis of rotation causing it to tend to move away from said axis of rotation as the mechanism is rotated;

said movement being resisted by fluid within said cylinder means on the piston rod end.

15. Said mechanism as in claim 14 wherein pressure sensitive controls means are a part of said valve means.

16. A mechanism as in claim 1 with an extended shaft body and cylinder means mounted to said shaft body and located generally equidistant from said bearing journals;

said cylinder means with piston rod means that extends and retracts describing a plane generally perpendicular to said rotational axis;

said cylinder means including a breather vent on the piston end;

said piston rod having a connecting boss on the extended end;

said mechanism including pivotable movable eccentric weight, pin mounted to said shaft body;

said pin mounting being generally parallel with the rotational axis of the mechanism;

said movable eccentric weight having bracket means to join pivotally with said piston rod connecting boss with connecting pin means;

said movable weight, connecting pin, piston rod, piston and common parts being a compound movable eccentric weight;

said compound eccentric weight having a center of gravity located off the axis of rotation causing it to tend to move pivotally away from axis of rotation when mechanism is rotated;

said movement being resisted by fluid within said cylinder means on said piston rod end.

17. Said mechanism as in claim 16 wherein pressure sensitive controls means are a part of said valve means.

* * * * *